June 17, 1952     W. J. POLYDOROFF     2,601,212
HEAT RESISTANT MAGNETIC CORES AND METHOD OF MAKING
Filed Nov. 9, 1948
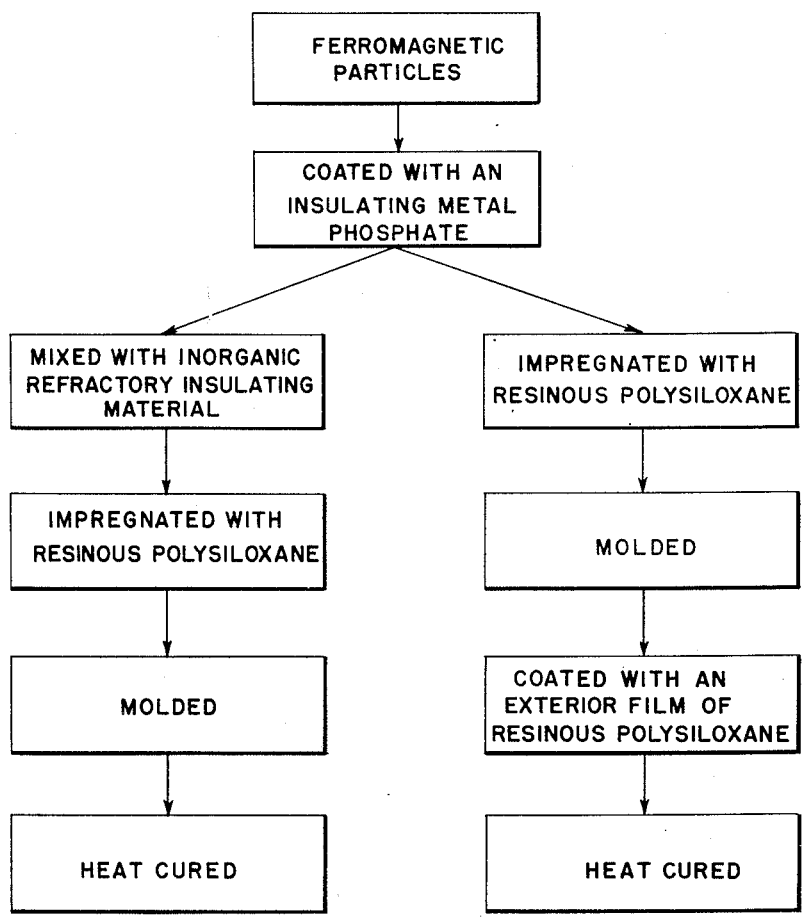
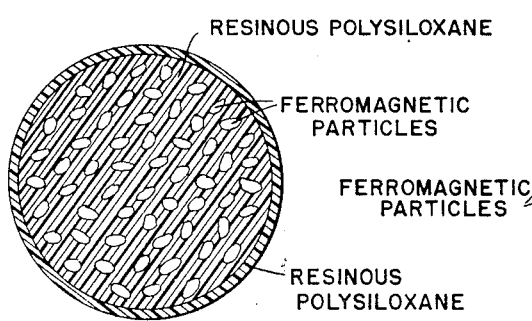
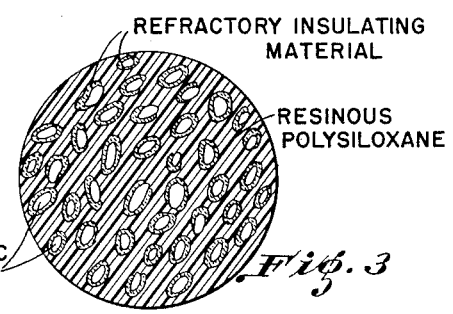
Inventor
WLADIMIR J. POLYDOROFF Patented June 17, 1952

2,601,212

UNITED STATES PATENT OFFICE 2,601,212

HEAT RESISTANT MAGNETIC CORES AND METHOD OF MAKING

Wladimir J. Polydoroff, Washington, D. C., assignor to General Aniline & Film Corporation, New York, N. Y., a corporation of Delaware No Drawing. Application November 9, 1948, Serial No. 59,187

8 Claims. (Cl. 18—475)

This invention relates to magnetic cores made of finely divided ferro-magnetic metals, which are suitable for induction coils in high frequency circuits, and to methods for making such coils.

It is an object of this invention to provide novel magnetic cores of powdered ferro-magnetic metals or alloys, especially carbonyl iron (i. e. iron powder obtained by thermodecomposition of iron carbonyl), which combine high permeability, high Q value (i. e. ratio of reactance to effective resistance) and low eddy current loss with high mechanical strength, resistance to breakage by shock and capacity to retain the foregoing advantageous properties at elevated temperatures of the order of 200° C. It is also an object of this invention to provide a method for manufacturing cores having the aforesaid advantages.

It was known heretofore to manufacture magnetic cores from finely divided ferro-magnetic metals and alloys, by mixing the metal particles, preferably provided with an individual insulating coating or ingredient, with an organic binder, e. g. urea-formaldehyde or phenol-formaldehyde resins, thermoplastic resins, varnishes, drying oils and the like, molding the mixture to the desired shape and curing, if necessary, during or after the molding operation.

Cores of the aforesaid type, containing an organic resin binder, were incapable, however, of withstanding temperatures of the order of 200° C. which are sometimes encountered in high frequency applications, since the binders were decomposed or charred and the cores rapidly lost their requisite characteristics.

Ceramic binders such as alkali metal silicates have also been employed in making cores from powdered ferro-magnetic metals, but while such binders withstand high temperatures without deterioration, the resulting cores are brittle, of poor mechanical strength, exceedingly fragile when subjected to shock and incapable of being machined.

More recently, a class of resins has become available which can be used for insulating purposes and which withstand temperatures as high as 260° C. without deterioration. These resins are organic siloxane polymers of which the units radicals have the formulae

and

wherein R is a hydrocarbon group (e. g. methyl, ethyl, phenyl, benzyl). These resins are obtainable in the form of liquids which are soluble in volatile organic solvents, including benzene and its homologues, and when heat cured, yield touch flexible films having good insulating properties.

When the aforesaid organic siloxane polymers are employed in the ordinary manner as a binder for finely divided ferro-magnetic metals such as carbonyl iron, the mixture being molded into a core, the resulting core, when heat cured or subjected to a temperature of 200° C., is subject to deterioration involving discoloration and loss of the required magnetic and electrical characteristics, the Q value decreasing to zero and the conductivity increasing in such a manner as to cause excessive eddy current losses.

I have discovered a method whereby the aforesaid organic siloxane polymers can be employed as a binder for finely divided ferro-magnetic metals or alloys, especially carbonyl iron, to yield cores which have a high Q value, high permeability, low eddy current loss, high mechanical strength, resistance to breakage by shock, suitable machining properties, and which retain these properties upon prolonged exposure to temperatures of 200° C.

In my invention, finely divided ferro-magnetic metals or alloys are employed, wherein the particles are of spherical shape and have an average weight diameter of 3–20 microns; preferably carbonyl iron powders are used, the particles of which have the aforesaid shape and dimensions. However, ferro-magnetic alloys such as alloys of iron and nickel or iron and cobalt, produced by thermo-decomposition of a mixture of the corresponding carbonyls, can also be used.

The metal particles are first provided with an individual insulating coating, preferably by depositing an insoluble metal phosphate such as iron, manganese or zinc phosphate thereon. This is accomplished by known methods wherein, for example, the powdered metal is treated with a weakly acid solution of the metal phosphates, the solution neutralized, and the particles bearing the resulting precipitated phosphate as a coating are washed and dried.

In accordance with one procedure of my invention, the individually insulated metal particles are mixed with a non-conducting inorganic spacing material, for example, by mixing the metal particles with a solution of alkali metal silicate, drying, and sifting the resulting powder consisting of agglomerates of the metal particles to reduce the size thereof so that the agglomerates will pass a screen having 100 meshes per linear inch. Instead of employing an alkali metal silicate, the particles can be mixed with a finely divided refractory insulating material such as talc, magnesium oxide, aluminum oxide, kaolin and the like, having a fineness comparable or preferably less than that of the metal particles. The resulting mixture is then impregnated or thoroughly mixed with a solution of an organic siloxane polymer of the type described above, in a volatile inert organic solvent; the solvent is evaporated, and the mixture molded at high pressure into the desired shape for magnetic cores. Thereafter, the molded cores are subjected to a heat curing treatment at 150–200° C. to cure the siloxane resin binder.

In an alternate procedure, incorporation of an insulating spacing material such as the alkali metal silicate or inorganic finely divided refractory material is omitted. However, in order to maintain the metal particles insulated from each other during the heat curing operation and subsequent exposure to operating temperatures of 200° C., the molded articles are coated with a film of the organic siloxane polymer employed as a binder before subjecting them to heat curing. Otherwise, if the organic spacing material as well as the aforesaid coating step is omitted, the particles, especially in the surface layer of the cores, become de-insulated upon stripping from the mold, and in the heat curing operation, discoloration will occur resulting in excessive conductivity and decrease of the Q value.

The cores obtained in accordance with the aforesaid procedures have high permeability, high density, low eddy current loss, and a Q value equal to at least 80% of the highest Q values obtainable when conventional resin binders are employed for making cores for operation at ordinary temperatures. In addition, the cores produced in accordance with my invention possess high mechanical strength so that they can be machined and are highly resistant to breakage by shock. Upon exposure for prolonged periods to temperatures of the order of 200° C., the foregoing advantageous properties are maintained.

In the accompanying drawing, Figure 1 illustrates by means of a flow-diagram the two processes of the instant invention. Figure 2 shows a section of a core produced in accordance with one of the processes of the instant invention. Figure 3 shows a section of a core produced in accordance with the second process of the instant invention.

Methods of making cores in accordance with my invention are illustrated in the following examples.

Example 1

100 grams of carbonyl iron of which the particles are of spherical shape and have an average weight diameter of 5 microns were reacted at 20–30° C. with 100 cc. of a weakly acid, previously boiled solution containing 1–2% of a mixture of approximately equal parts of iron and manganese phosphates, for a period from one-half to one minute. The solution was neutralized by adding dilute aqueous sodium bicarbonate solution, and the carbonyl iron powder bearing an insulating coating of manganese and iron phosphates was separated from the solution, washed thoroughly with water and dried.

The resulting insulated iron powder was thoroughly mixed with 2–4 grams of water glass (aqueous sodium silicate solution of about 50% concentration) previously diluted with 5–10 cc. of water, and the mixture dried with mild agitation, preferably in vacuo, at temperatures up to 100° C.

The product thereby obtained consisted of frangible agglomerates of the iron particles, bound together by the alkali metal silicate which acted as an insulating spacing material between the particles. This product was sifted through a screen having 100 meshes to a linear inch, to reduce any oversized agglomerates so that they passed the screen.

The resulting powder was thoroughly mixed with 4 grams of a film-forming, heat-curable hydrocarbon siloxane polymer, previously diluted with 10–20 cc. of benzene, toluene or other inert volatile organic solvent. The solvent was evaporated at 100° C., yielding a tacky, powdered mass of the siloxane resin and the particle agglomerates. This mass was molded at a pressure of 5–30 tons per square inch without heating, into small cylinders (e. g. one-half inch long and one-quarter inch in diameter), and toroids (e. g. of rectangular cross-section, one-half inch high, with inside diameter of one inch and outside diameter of one and one-half inches). These molded shapes were cured for one to two hours at 200° C., or for about four hours at 150° C. If desired, the surface of the molded articles can be coated with a film of organic siloxane polymer before or after the aforesaid heat curing operation, by dipping them into a solution of the resin similar to that used for impregnating the powder, the solvent being evaporated. When such a coating is applied after the initial heat curing treatment, a second heat curing treatment under similar conditions is advantageously effected.

The resulting cores are characterized by high mechanical strength adequate for threading them on a grinder, and possess high permeability, low eddy current loss, and a Q value at least 80% of the best Q value obtained by employing a conventional resin binder with insulated particles of the same type for making a core operating at ordinary temperatures. Upon heating for 10 hours at 200° C., the aforesaid properties of the cores remain substantially unchanged, the Q value decreasing not more than 5% from its original value. The cores are suitable for use in apparatus operating at a frequency of 50 megacycles.

Example 2

100 grams of carbonyl iron powder bearing individual particle insulation of manganese and iron phosphate, produced as described in the preceding example, were thoroughly mixed with 2–6 grams of organic siloxane polymer in benzene solution, of the same type employed in Example 1, and the solvent was evaporated at a temperature of 100° C. The resulting tacky mass was molded without heating into shapes similar to those of Example 1. After extraction from the mold, the articles were dipped into a solution of the organic siloxane polymer resin similar to that previously added to the powder. After drying, the cores were heat cured in the same manner described in the preceding example.

The resulting cores had advantages similar to those of the cores of Example 1 and withstood temperatures of 200° C. for 10 hours with not more than a 10% decrease in the Q value. The cores were otherwise unaffected by the high temperature.

Instead of the carbonyl iron powder employed in the foregoing examples, carbonyl iron of a different grade can be used wherein the particles have an average weight diameter of 3–20 microns. For high frequency applications involving frequencies of 50 megacycles, carbonyl iron having an average diameter of 3-5 microns is preferred. Other finely divided ferro-magnetic metals or alloys such as iron-nickel or iron-cobalt alloys can be substituted for carbonyl iron in the examples, providing the particles are of spherical shape and their size is within the aforesaid range. When metal powders are employed in which the particle size is larger than that used in the foregoing examples, the proportion of the organic siloxane polymer resin used as a binder is preferably decreased to 1% of the weight of the metal as the average diameter increases to 20 microns; while if smaller particles having an average diameter, for example, of 3 microns are used, the amount of said binder is preferably increased to about 6% of the weight of the metal. A suitable amount of organic solvent for incorporating the resin with the metal powders generally amounts to 10-20% of the weight of the metal. Ordinarily, benzene and its homologues, e. g. toluene or xylene, are best suited as solvents for the siloxane resin.

In preparing the metal phosphate insulation, the conventional procedure is used, the amount of metal phosphate being in general 1-2% of the weight of the metal powder. For powders of the degree of fineness represented in the examples, a mixture of iron and manganese phosphate is preferred. Other insoluble metal phosphates, e. g. zinc phosphate, are better adapted for powders of substantially larger average particle size.

When an insulating spacer is used, a suitable amount is from 1-2% on a dry basis of the weight of the metal. Alkali metal silicates, use of which is described in the examples, are preferred. Talc, kaolin, aluminum oxide, magnesium oxide, and similar inert inorganic insulating materials can be used instead in similar amounts, providing they have a fineness comparable with or less than that of the metal particles. Such materials are most conveniently mixed with the metal particles in dry form, although they can be added in the form of a slurry from which the liquid is subsequently evaporated. The water present in alkali metal silicate solutions, or as a medium for a slurry of a refractory inorganic spacer of the type mentioned above, is preferably removed from the metal powder by drying in vacuo.

The amount of organic siloxane resin polymer can vary from 1-6% of the metal particles, the amount preferably being increased as the average size of the particles decreases within the range of 3-20 microns.

In molding the core from the powder and resin mixture, pressures of 5-30 tons per square inch have been found satisfactory.

The cores prepared in accordance with my invention are especially adapted for use in inductance coils for high frequency operation, particularly frequencies of the order of 50 megacycles.

Other variations and modifications which will be obvious to those skilled in the art can be made in the foregoing procedures without departing from the scope of this invention.

I claim:

1. A magnetic core suitable for high temperature, high frequency purposes, made up of a compact mass of finely divided ferro-magnetic particles of spherical shape having an average diameter of 3-20 microns, and having an insulating coating of an insoluble metal phosphate thereon; an inorganic refractory insulating material intermingled with the coated particles; and as a binder, a heat-cured resinous hydrocarbon siloxane polymer amounting to 1-6% of the weight of the metal.

2. A magnetic core suitable for high temperature, high frequency purposes, made up of a compact mass of finely divided ferro-magnetic particles of spherical shape having an average diameter of 3-20 microns, and having an insulating coating of an insoluble metal phosphate thereon; a heat-cured resinous hydrocarbon siloxane polymer as a binder, amounting to 1-6% of the weight of the metal; and an external coating of said polymer on the surface of the core.

3. A magnetic core suitable for high temperature, high frequency purposes, made up of a compact mass of carbonyl iron powder of which the particles have an average diameter of 3-5 microns, said particles having an insulating coating thereon of a mixture of iron and manganese phosphates; a heat-cured resinous hydrocarbon siloxane polymer as a binder therefor amounting to about 4-6% of the weight of the iron; and an external coating of said polymer on the surface of the core.

4. A magnetic core suitable for high temperature, high frequency purposes, made up of a compact mass of carbonyl iron powder of which the particles have an average diameter of 3-5 microns, said particles having an insulating coating of a mixture of iron and manganese phosphates; an alkali metal silicate distributed between the particles as a spacing material, and amounting to 1-2% by weight of the iron; and as a binder, a heat-cured resinous hydrocarbon siloxane polymer amounting to 4-6% of the weight of the iron.

5. The method of making a magnetic core for high temperature, high frequency purposes, which comprises forming an insulating metal phosphate coating on the individual particles of a finely divided ferro-magnetic metal of which the particles are spherical in shape and have an average diameter of 3-20 microns, impregnating the particles with a heat-curable resinous hydrocarbon siloxane polymer amounting to 1-6% of the weight of the metal, molding a core from the resulting mixture under a pressure of 5-30 tons per square inch, coating the molded core with a film of said polymer, and heat curing the core at a temperature of 150-200° C.

6. The method of making a magnetic core for high temperature, high frequency purposes, which comprises forming an insulating metal phosphate coating on the individual particles of a finely divided ferro-magnetic metal of which the particles are spherical in shape and have an average diameter of 3-20 microns, uniformly intermingling an inorganic refractory insulating material with the coated particles, impregnating the mixture, while dry, with a heat-curable resinous hydrocarbon siloxane polymer, amounting to 1-6% of the weight of the metal, molding a core from the resulting mixture under a pressure of 5-30 tons per square inch, and heat curing the molded core at a temperature of 150-200° C.

7. The method of making a magnetic core for high temperature, high frequency purposes, which comprises forming an insulating coating of a mixture of iron and manganese phosphates on the individual particles of carbonyl iron powder, said particles having an average diameter of 3-5 microns, impregnating the insulated particles with a heat-curable resinous hydrocarbon siloxane polymer amounting to 4–6% of the weight of the iron, molding a core from the mixture under a pressure of 5–30 tons per square inch, coating the molded core with a film of said polymer, and heat curing the core at a temperature of 150–200° C.

8. The method of making a magnetic core for high temperature, high frequency purposes, which comprises forming an insulating coating of a mixture of iron and manganese phosphates on the individual particles of carbonyl iron powder of which the particles have an average diameter of 3–5 microns, mixing an aqueous alkali metal silicate with the insulated particles, the amount of said silicate being, on a dry basis, 1–2% of the weight of the iron, drying the resulting mixture, impregnating the resulting iron-silicate mixture with a heat-curable resinous hydrocarbon siloxane polymer amounting to 4–6% of the weight of the iron, molding a core from the resulting mixture at 5–30 tons per square inch, and heat curing the molded core at a temperature of 150–200° C.

WLADIMIR J. POLYDOROFF.

REFERENCES CITED

The following references are of record in the file of this patent:

UNITED STATES PATENTS

| Number | Name | Date |
| --- | --- | --- |
| Re. 20,507 | Andrews | Sept. 14, 1937 |
| 1,455,199 | Groten, Jr. | May 15, 1923 |
| 1,789,477 | Roseby | Jan. 20, 1931 |
| 1,818,070 | Lathrop | Aug. 11, 1931 |
| 1,850,181 | Roseby | Mar. 22, 1932 |
| 1,982,690 | Polydoroff | Dec. 4, 1934 |
| 2,064,771 | Vogt | Dec. 15, 1936 |
| 2,076,230 | Gillis | Apr. 6, 1937 |
| 2,095,705 | Kessler | Oct. 12, 1937 |
| 2,231,160 | Gottschalt | Feb. 11, 1941 |
| 2,232,352 | Verweij et al. | Feb. 18, 1941 |
| 2,418,935 | Hutchinson | Apr. 15, 1947 |

OTHER REFERENCES

"Dow Corning Silicones—New Engineering Materials," catalog published 1947; by Dow Corning Corp., Midland, Mich., page 9.